(12) United States Patent
Grant et al.

(10) Patent No.: US 11,915,085 B2
(45) Date of Patent: Feb. 27, 2024

(54) SYSTEMS AND METHODS FOR ENHANCED DIRECTIONALITY IN RFID PORTAL SYSTEMS

(71) Applicant: ZEBRA TECHNOLOGIES CORPORATION, Lincolnshire, IL (US)

(72) Inventors: Robert E. Grant, Coram, NY (US); Michael J. Koch, Saint James, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/751,138

(22) Filed: May 23, 2022

(65) Prior Publication Data
US 2023/0409846 A1    Dec. 21, 2023

(51) Int. Cl.
*G06K 7/10* (2006.01)
*G01S 13/46* (2006.01)

(52) U.S. Cl.
CPC .......... *G06K 7/10099* (2013.01); *G01S 13/46* (2013.01); *G06K 7/10376* (2013.01)

(58) Field of Classification Search
None
See application file for complete search history.

(56) References Cited

U.S. PATENT DOCUMENTS

| | | | | |
|---|---|---|---|---|
| 10,657,597 B1 * | 5/2020 | Billman | ................ | G06Q 40/08 |
| 10,664,918 B1 * | 5/2020 | Slusar | ................... | B60W 40/09 |
| 10,718,628 B2 * | 7/2020 | Shiina | ................ | G01C 21/3679 |
| 10,796,369 B1 * | 10/2020 | Augustine | .............. | G06Q 40/08 |
| 10,846,946 B2 * | 11/2020 | Crona | .................... | G08G 1/015 |
| 2009/0115638 A1 * | 5/2009 | Shankwitz | ........... | G08G 1/0104 |
| | | | | 340/988 |
| 2012/0271540 A1 * | 10/2012 | Miksa | .................... | G08G 1/167 |
| | | | | 701/409 |
| 2013/0124083 A1 * | 5/2013 | Kratzsch | ............ | G01C 21/3602 |
| | | | | 701/445 |
| 2017/0287297 A1 * | 10/2017 | Hardie-Bick | ........ | G08B 13/246 |
| 2018/0295466 A1 * | 10/2018 | Cannell | ............... | H04W 40/244 |
| 2018/0365502 A1 * | 12/2018 | Stein | ..................... | G06T 3/0093 |
| 2019/0106118 A1 * | 4/2019 | Asakura | ................... | G08G 1/04 |

(Continued)

FOREIGN PATENT DOCUMENTS

| | | | |
|---|---|---|---|
| CN | 103699916 B2 | 6/2017 | |
| JP | 6696377 B2 | 5/2020 | |

OTHER PUBLICATIONS

International Search Report and Written Opinion for International Application No. PCT/US2023/16702 dated Jul. 12, 2023.

*Primary Examiner* — Fekadeselassie Girma

(57) ABSTRACT

Systems and methods for enhanced directionality for portal detector stations are provided. The systems include a portal detector station, an overhead detector station, a controller operatively coupled thereto. In embodiments, the controller analyzes read events detected by the portal detector station to determine a set of RFID tags included in a pallet of objects. The controller also analyzes read events detected by the overhead detector station to determine a direction of travel for the RFID tags included in the set of RFID tags and/or to detect stray read events that resulted in RFID tags being erroneously included in the set of RFID tags.

18 Claims, 5 Drawing Sheets

(56) References Cited

U.S. PATENT DOCUMENTS

| | | | | |
|---|---|---|---|---|
| 2019/0164423 | A1* | 5/2019 | Bai | G08G 1/096791 |
| 2020/0363211 | A1* | 11/2020 | Furuichi | G01C 21/30 |
| 2021/0065473 | A1* | 3/2021 | Diehl | G07C 5/0808 |
| 2021/0231770 | A1* | 7/2021 | Koch | G01S 13/75 |
| 2023/0177287 | A1* | 6/2023 | Austin | G06K 7/10099 |
| | | | | 340/10.1 |

* cited by examiner

FIG. 3

SYSTEMS AND METHODS FOR ENHANCED DIRECTIONALITY IN RFID PORTAL SYSTEMS

BACKGROUND

Radio frequency (RF) identification (RFID) tracking systems are generally used to track the position of RFID tags disposed throughout a venue. One common type of venue where RFID tracking systems are implemented are warehouses. For example, warehouse operators may install an RFID tracking system at a loading dock to track RFID tags affixed to objects that are entering and/or leaving the warehouse. This enables the warehouse operator to automate their inventory management systems that track which objects are currently located in the warehouse.

One type of RFID detector station commonly used to monitor loading bays is a portal RFID detector station. Portal detector stations are generally floor-mounted detector stations configured to transmit and receive RFID signals in a fixed direction. In a typical configuration, an individual loading bay of a loading dock includes one or more respective portal detector stations configured to detect the presence of RFID tags located in the loading bay. However, given the fixed radiation patterns associated with portal detector stations, it is difficult to determine whether an RFID tag is moving in an egress direction (e.g., into a trailer positioned in the loading bay) or in an ingress direction (e.g., into the warehouse). This makes automated inventory management systems prone to errors caused by incorrect determination of the direction of travel past a portal detector station.

Moreover, objects that pass through the loading bay are typically packaged into a pallet of objects. Thus, there are often dozens, if not hundreds, of objects passing through the signal range of the portal detector station. These objects tend to shield RFID tags affixed to objects further away from the portal detector station. Accordingly, portal detector stations are typically operated at a fairly high level of effective isotropic radiated power (EIRP). As a result, portal detector stations are prone to sensing stray RFID tags positioned in locations not associated with the corresponding loading bay. As a result, automated inventory management systems may erroneously associate these stray RFID tags with the pallet of objects.

In view of the above-described sources of error when using portal detector stations, it is beneficial to be able to accurately determine the direction of travel of RFID tags as they pass through the signal range of a portal detector stations. Similarly, it is beneficial to be able to detect stray RFID tag read events to enable the correct determination of which objects are included in a given pallet of objects. Accordingly, there is a need for systems and methods for enhanced directionality in RFID portal systems.

SUMMARY

In an embodiment, the present invention is a system for determining directionality of a radio frequency identification (RFID) tag within a venue. The system includes (i) first RFID transceiver arrangement configured to interrogate RFID tags disposed within a lane of a venue, wherein the first RFID transceiver arrangement is configured to have a signal range that extends over at least a first portion of the lane; (ii) a second RFID transceiver arrangement configured to interrogate RFID tags disposed within the venue, wherein the second RFID transceiver arrangement is configured to generate a beam in a plurality of directions relative to the second RFID transceiver arrangement, wherein at least one of the directions extends over at least a second portion of the lane, the second portion of the lane being proximate to the first portion of the lane; and (iii) a controller operatively connected to the first RFID transceiver arrangement and the second RFID transceiver arrangement. The controller is configured to (1) detect, via the first RFID transceiver arrangement, a first plurality of read events respectively corresponding to a first set of RFID tags; (2) detect, via the second RFID transceiver arrangement, a second plurality of read events respectively corresponding to a second set of RFID tags, wherein the second plurality of read events occurred within a threshold time from the first plurality of read events; (3) determine that a particular RFID tag is included in both the first set of RFID tags and the second set of RFID tags; (4) based upon the read events for the particular RFID tag detected via the second RFID transceiver arrangement, determine a direction of travel for the particular RFID tag; and (5) associate the determined direction of travel with RFID tags included in the first set of RFID tags.

In another embodiment, the present invention is a system for detecting stray radio frequency identification (RFID) tag read events at a venue. The system includes (i) a first RFID transceiver arrangement configured to interrogate RFID tags disposed within a lane of a venue, wherein the first RFID transceiver arrangement is configured to have a signal range that extends over at least a first portion of the lane; (ii) a second RFID transceiver arrangement configured to interrogate RFID tags disposed within the venue, wherein the second RFID transceiver arrangement is configured to generate a beam in a plurality of directions relative to the second RFID transceiver arrangement, wherein at least one of the directions extends over at least a second portion of the lane, the second portion of the lane being proximate to the first portion of the lane; and (iii) a controller operatively connected to the first RFID transceiver arrangement, the second RFID transceiver arrangement. The controller is configured to (1) detect, via the first RFID transceiver arrangement, a first plurality of read events respectively corresponding to a first set of RFID tags; (2) detect, via the second RFID transceiver arrangement, a second plurality of read events respectively corresponding to a second set of RFID tags, wherein the second plurality of read events occurred within a threshold time from the first plurality of read events; (3) determine that a particular RFID tag is included in both the first set of RFID tags and the second set of RFID tags; (4) based upon the read events for the particular RFID tag detected via the second RFID transceiver arrangement, determine that the particular RFID tag is not located in the lane; and (5) delete the particular RFID tag from the first set of RFID tags.

In another embodiment, the present invention is a method for determining directionality of a radio frequency identification (RFID) tag within a venue using an RFID tag tracking system. The RFID tag tracking system includes (i) a first RFID transceiver arrangement configured to interrogate RFID tags disposed within a lane of a venue, wherein the first RFID transceiver arrangement is configured to have a signal range that extends over at least a first portion of the lane; (ii) a second RFID transceiver arrangement configured to interrogate RFID tags disposed within the venue, wherein the second RFID transceiver arrangement is configured to generate a beam in a plurality of directions relative to the second RFID transceiver arrangement, wherein at least one of the directions extends over at least a second portion of the lane, the second portion of the lane being proximate to the first portion of the lane; and (iii) a controller operatively connected to the first RFID transceiver arrangement and the second RFID transceiver arrangement. The method includes (1) detecting, via the first RFID transceiver arrangement, a first plurality of read events respectively corresponding to a first set of RFID tags; (2) detecting, via the second RFID transceiver arrangement, a second plurality of read events respectively corresponding to a second set of RFID tags, wherein the second plurality of read events occurred within a threshold time from the first plurality of read events; (3) determining, by the controller, that a particular RFID tag is included in both the first set of RFID tags and the second set of RFID tags; (4) based upon the read events for the particular RFID tag detected via the second RFID transceiver arrangement, determining, by the controller, a direction of travel for the particular RFID tag; and (5) associating, by the controller, the determined direction of travel with RFID tags included in the first set of RFID tags.

In another embodiment, the present invention is a method for detecting stray radio frequency identification (RFID) tag read events at a venue using an RFID tag tracking system. The RFID tag tracking system includes (i) a first RFID transceiver arrangement configured to interrogate RFID tags disposed within a lane of a venue, wherein the first RFID transceiver arrangement is configured to have a signal range that extends over at least a first portion of the lane; (ii) a second RFID transceiver arrangement configured to interrogate RFID tags disposed within the venue, wherein the second RFID transceiver arrangement is configured to generate a beam in a plurality of directions relative to the second RFID transceiver arrangement, wherein at least one of the directions extends over at least a second portion of the lane, the second portion of the lane being proximate to the first portion of the lane; and (iii) a controller operatively connected to the first RFID transceiver arrangement and the second RFID transceiver arrangement. The method comprising (1) detecting, via the first RFID transceiver arrangement, a first plurality of read events respectively corresponding to a first set of RFID tags; (2) detecting, via the second RFID transceiver arrangement, a second plurality of read events respectively corresponding to a second set of RFID tags, wherein the second plurality of read events occurred within a threshold time from the first plurality of read events; (3) determining, by the controller, that a particular RFID tag is included in both the first set of RFID tags and the second set of RFID tags; (4) based upon the read events for the particular RFID tag detected via the second RFID transceiver arrangement, determining, by the controller, that the particular RFID tag is not located in the second portion of the lane; and (5) deleting, by the controller, the particular RFID tag from the first set of RFID tags.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 3 illustrates an example user interface for tracking RFID tags via the disclosed RFID tracking systems.

Figure 1:
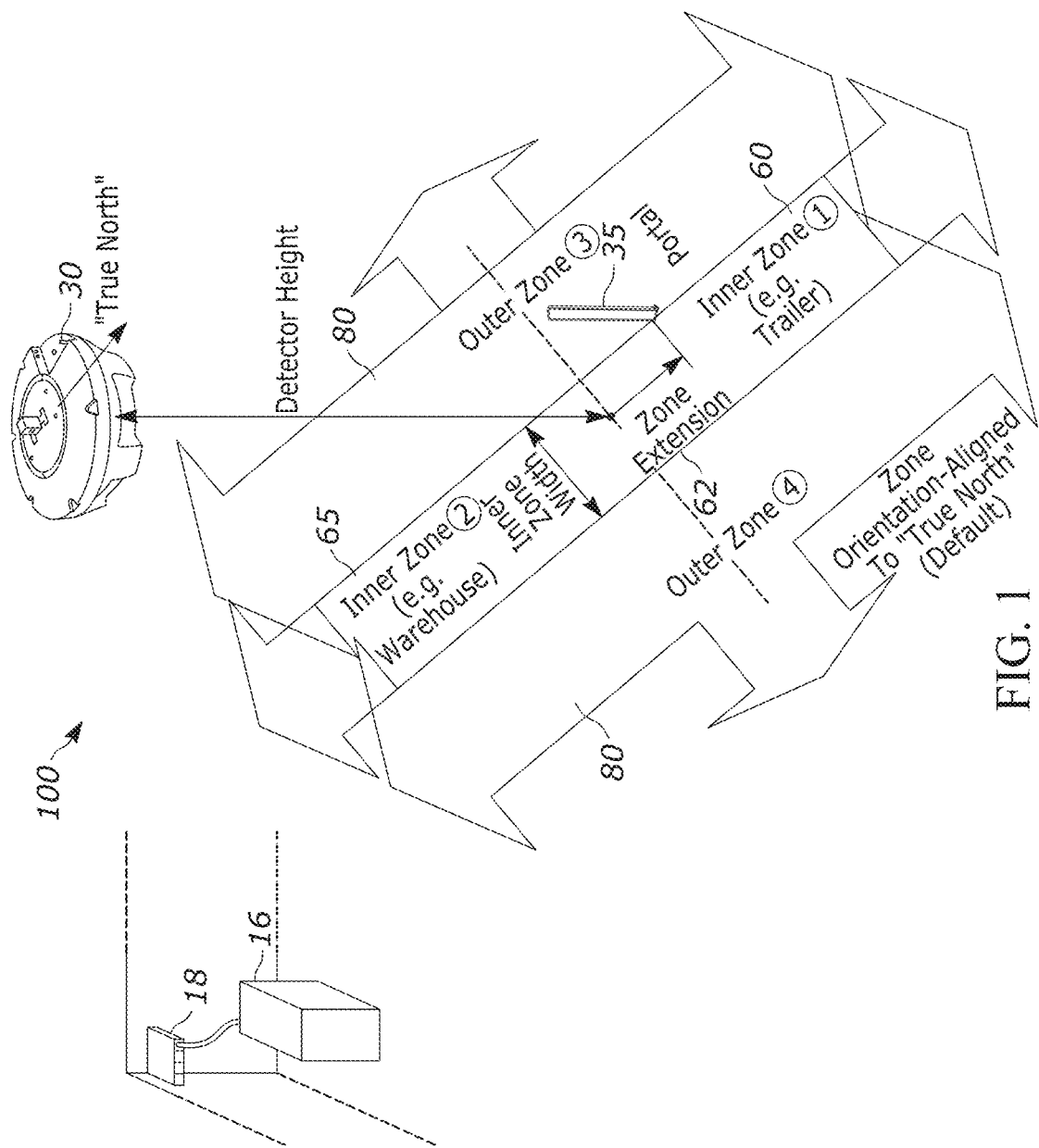
FIG. 1 illustrates a perspective of an example venue that includes an RFID tracking system for tracking a single lane, as disclosed herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 is a perspective view, as seen from above, of a venue 100 illustrating an arrangement for which a Radio Frequency Identification (RFID) tracking system within the venue 100 is deployed to facilitate tracking objects within the venue. Although the example venue 100 is a warehouse, other types of venues that have lanes (such as a port, a railyard, a depot, and so on) are envisioned. In the example embodiment of FIG. 1, the venue 100 includes a backroom that has a central controller 16. In other embodiments, the central controller 16 may be located off-venue. The central controller 16 may be operated by venue personnel and/or personnel associated with the RFID tracking system.

The central controller 16 may comprise a networked host computer or server. The central controller 16 may be connected to a plurality of detector stations 30, 35 positioned throughout the venue 100 via the network switch 18. As further described herein, the detector stations 30, 35 include RFID readers that are able to detect RFID tags (not depicted) that are affixed to objects (such as packages or other goods) that move through the venue 100. In many scenarios, a plurality of objects are carried together as a pallet of objects having respective RFID tags affixed thereto. The detector stations 30, 35 may include other sensors in addition to the RFID readers, for example, image sensors, ultrasonic sensors, etc.

The plurality of detector stations 30, 35 includes one or more portal RFID detector stations 35 configured to detect RFID tags located within a respective lane of the venue 100. It should be appreciated that while the example venue 100 depicts a single portal detector station 35 configured to monitor a single lane (the combined areas 60, 65), the venue 100 may include any number of additional portal detector stations 35 configured to monitor additional lanes. Additionally, although the portal detector station 35 is shown as a single unit, in some embodiments, a venue operator may deploy additional portal detector stations 35 to monitor the areas 60, 65. For example, in an arrangement that uses two portal detector stations 35, an individual portal detector station 35 is placed on either side of the lane such that their respective signal ranges extend both outwards over the lane.

As an another example, in an arrangement that uses three portal detector stations 35, two of the portal detector stations 35 are configured in the same manner as the two portal detector unit arrangement and a third portal detector station 35 is mounted to a truss extending over the lane and having a signal range that extends downwards toward the ground. In these multiple portal detector station embodiments, the central controller 16 may be configured to control each of the portal detector stations associated with a lane as a single integrated portal unit. Accordingly, while the following description generally refers to a single portal detector station 35 corresponding to a single lane, any such reference envisions an alternate embodiment that includes an arrangement of multiple integrated portal detector station 35 configured to monitor the single lane.

During operation, as a pallet of objects passes through the signal range of the detector station 35, the detector station 35 is configured to interrogate RFID tags affixed to objects included in the pallet. In some embodiments, this interrogation occurs over a read window that lasts multiple interrogation cycles (e.g., 2 seconds, 5 seconds, 5 interrogation cycles, 10 interrogation cycles, etc.). At the end of the read window, the RFID tracking system may determine a set of unique RFID tag identifiers associated with a read event within the read window. In some embodiments, the portal detector station 35 determines the set of unique RFID tag identifiers corresponding to the pallet and reports the set to the central controller 16 upon the conclusion of the read window. In other embodiments, the portal detector station 35 relays each set of read events to the central controller 16 which, in turn, determines the unique set of RFID tag identifiers corresponding to the pallet.

As described above, it is difficult to determine the direction of travel of an RFID tag (and, thus, the corresponding object) as it passes the portal detector stations 35. Accordingly, to overcome this drawback, the RFID tracking system implemented at the example venue 100 also includes one or more overhead detector stations 30. It should be appreciated that while the term "overhead" is generally used herein to describe the detector stations 30 to refer to the detector stations 30 being mounted to a ceiling, in other embodiments, the detector stations 30 may be mounted to a wall or other high location at the venue 100. Accordingly, the term "overhead" should be understood as being mounted to a surface above a certain height so as to have a signal range that covers the lane (e.g., the areas 60, 65) as well as areas outside of the lane (e.g., the area 80).

Each of the detector stations 30, 35 may either be in either wired or wireless electronic communication with central controller 16 via the network switch 18. For example, in some embodiments, the detector stations 30, 35 may be connected via Category 5 or 6 cables and use the Ethernet standard for wired communications. In other embodiments, the detector stations 30, 35 may be connected wirelessly, using built-in wireless transceiver, and may use the IEEE 802.11 (WiFi) and/or Bluetooth standards for wireless communications. Other embodiments may include detector stations 30, 35 that use a combination of wired and wireless communication. As the read events are detected by the detector stations 30, 35, the detector stations 30,35 report information related to the read events to the centralized controller 16 for processing thereat.

Unlike the portal detector stations 35, the overhead detector stations 30 are configured to implement beam steering techniques that enable the RFID tracking system to determine the location of RFID tags within a signal range of the overhead detector station 30. For example, the overhead detector station 30 may divide the signal range into a predetermined number of zone sectors or bearing sectors (e.g. elevation and azimuth) and associate a set of coefficients to apply to a plurality of RFID transceivers such that the transmitted signal constructively interferes to produce a beam oriented towards its corresponding sector.

During a transmit period of an interrogation cycle, the overhead detector station 30 may be configured to transmit an interrogation signal over one or more of the sectors via the corresponding beams. Thus, the overhead detector station 30 emits beams in such a manner so as to sweep across the full signal range that covers the areas 60, 65, and 80 over one or more interrogation cycles.

During a receive period of the interrogation cycle, the overhead detector station 30 may configure the plurality of RFID transceivers to operate to produce multiple beams in parallel or in succession to operate omnidirectionally across the predetermined bearing sectors. This enables the overhead detector station 30 to determine an angle of arrival for an interrogation response received from an RFID tag. Using the known location of the overhead detector station 30 and the angle of arrival, the detector station 30 is able to estimate a position of the RFID tag that corresponds to the interrogation response at the venue. Accordingly, by determining the position of the RFID tag at least two different times, the RFID tracking system is able to determine a direction of travel for the RFID tag.

Generally, the instant techniques are primarily concerned with a direction of travel with respect to a linear lane. For example, in the example venue 100, the instant techniques are primarily concerned with determining whether an RFID is moving along the lane from the warehouse-side area 65 towards the trailer-side area 60 or from the trailer-side area 60 towards the warehouse-side area 65. This enables the venue operator to determine whether the corresponding object is entering or exiting the venue 100. Accordingly, the overhead detector unit 30 may be configured with an axis (the illustrated "true north") defined by a lane of the venue (e.g., the areas 60, 65). When the RFID tracking system determines a direction of travel, the RFID tracking system may determine a shift in position along this axis. In the illustrated example, when the overhead detector stations 30 determines that an RFID tag is moving "north," the overhead detector station 30 determines that the RFID tag is moving in an egress direction. Similarly, when the overhead detector stations 30 determines that an RFID tag is moving "south," the overhead detector station 30 determines that the RFID tag is moving in an ingress direction. While techniques disclosed herein generally assume that the lane is linear, the lane can be defined as having a path of any shape through the venue 100. For non-linear lanes, the orientation of the axis defined by the lane of venue may change depending upon the position of the RFID tag along the lane and the shape of the lane at that position.

In some embodiments, the central controller 16 is configured to determine the direction of travel. In these embodiments, the overhead detector station 30 reports the read events and the determined positions to the central controller 16 for tracking thereat. Accordingly, the central controller 16 can track the position of an individual RFID tags across multiple read events to determine the direction of travel. In other embodiments, the overhead detector station 30 tracks the position of individual RFID tags over time and reports the direction of travel to the central controller 16.

It should be appreciated that given the distance of the overhead detector station 30 from the pallet of objects, the interrogation signal may not be emitted with sufficient transmit power to radiate through the objects and reach the RFID tags located in a bottom layer of the pallet. Accordingly, if the RFID tracking system only relied on the overhead detector stations 30, the RFID tracking system would be unable to reliably detect and process the interrogation responses from each RFID tag included in the pallet.

Techniques disclosed herein relate to combining the ability of the portal detector station 35 to reliably interrogate each RFID tag in a pallet with the ability of the overhead detector station 30 to determine a position of an RFID tag to overcome the above-described shortcomings of portal detector stations 35 and overhead detector stations 30 individually. To this end, because each object in a pallet of objects typically moves through the venue 100 in the same movement pattern, when the overhead detector station 30 determines the direction of travel for a single RFID tag included in the pallet (typically one of the RFID tags located in an upper layer of the pallet), it can be assumed that the remaining RFID tags in the pallet are moving in the same direction. Accordingly, the central controller 16 is able to analyze the read events detected by the portal detector station 35 to derive the set of RFID tags included in a pallet. If, based on read events detected by the overhead detector station 30, the RFID tracking system has determined the direction of travel for at least one tag in the set of RFID tags included in the pallet, the central controller 16 can then apply the determined direction of travel to the other RFID tags included in the set of RFID tags detected by the portal detector station 35. As a result, the RFID tracking system is able to reliably determine the direction of travel for each RFID tag included in the pallet.

The central controller 16 may be configured to perform an inventory management task based upon the determined direction of travel. For example, if the central controller 16 determines that the unique set of RFID tags corresponding to the pallet is entering the venue 100, the central controller 16 may update an inventory record of the warehouse to include an indication of the corresponding RFID tag identifiers. This may cause a billing system associated with the venue 100 to generate an accounting record for the objects on which the RFID tags are affixed. As another example, if the central controller 16 determines that the unique set of RFID tags corresponding to the pallet is leaving the venue 100, the central controller 16 may update an inventory record of a shipping container or vehicle located in the loading bay to include an indication of the corresponding RFID tag identifiers.

Because the RFID tag tracking techniques are primarily applied to determine whether or not the RFID tags are entering or exiting the venue 100, the RFID tracking system does not need to determine the direction of travel for the RFID tags in real time. That is, the RFID tracking system may be configured to determine the direction of travel for the RFID tags within a threshold time (e.g., 2 seconds, 5 seconds, 15 seconds) before or after the read window of the portal detector station 35. To ensure that the RFID tags respond to an interrogation signal from the portal detector station 35, and not an interrogation signal from the overhead detector station 30 during the read window, it is preferred that the overhead detector station 30 and the portal detector station 35 avoid simultaneously interrogating RFID tags disposed in the same area of the venue 100. Accordingly, the overhead detector station 30 is preferably positioned offset from the signal range of the portal detector station 35 along the axis defined by the lane. As a result, the overhead detector station 30 may configure its RFID transceivers to transmit a beam directed at the, trailer-side inner zone 60 and/or the warehouse-side inner zone 65 such that a minimal amount (e.g., less than 20% of the EIRP) of the emitted radiation overlaps with the signal range of the portal detector station 35 (which is generally directed at the zone extension 62. Regardless, if an RFID tag does respond to the interrogation signal from the overhead detector station 30 during the read window, the RFID tracking system may still use the corresponding position information from the read event to determine the direction of travel for the RFID tag.

As described above, the portal detector station 35 occasionally interrogates RFID tags disposed outside of the associated lane, such as an RFID tag location in the areas 80, due to the need to use sufficient EIRP to cause the signal to radiate through the objects to reach RFID tags on the opposite end of the pallet. This stray read event problem is also solved by integrating the position data derived based upon read events detected at the overhead detector station 30. To this end, based upon the angle of arrival for the interrogation response detected by the overhead detector station 30, the RFID tracking system is able to determine whether the responding RFID tag is positioned in the lane (e.g., the areas 60, or outside of the lane (e.g., the areas 80). If the RFID tag is positioned outside of the lane, it is unlikely that the RFID tag is affixed to an object included in the pallet moving along the lane. In this scenario, the central controller 16 may remove or delete the RFID tag identifier from the set of RFID tag identifiers associated with the pallet. As a result, the RFID tracking system is able to avoid erroneously associating an RFID tag with the pallet.

To determine the particular area in which an RFID tag is positioned, the RFID tracking system may provide a user interface that enables the venue operator to define geographic regions within the venue that correspond to the lane. The user interface may also include a depiction of the location of the detector stations 30, 35 so as to enable the venue operator to associate a particular lane with the corresponding detector stations 30, 35 associated therewith. The RFID tracking system may then store these user-defined regions and associations in the central controller 16. Accordingly, when the central controller 16 determines whether or not an RFID tag is positioned within a lane of the venue, the central controller 16 uses an identifier of the overhead detector station 30 that processed the read even to identify the geographic region for the corresponding lane.

Figure 2:
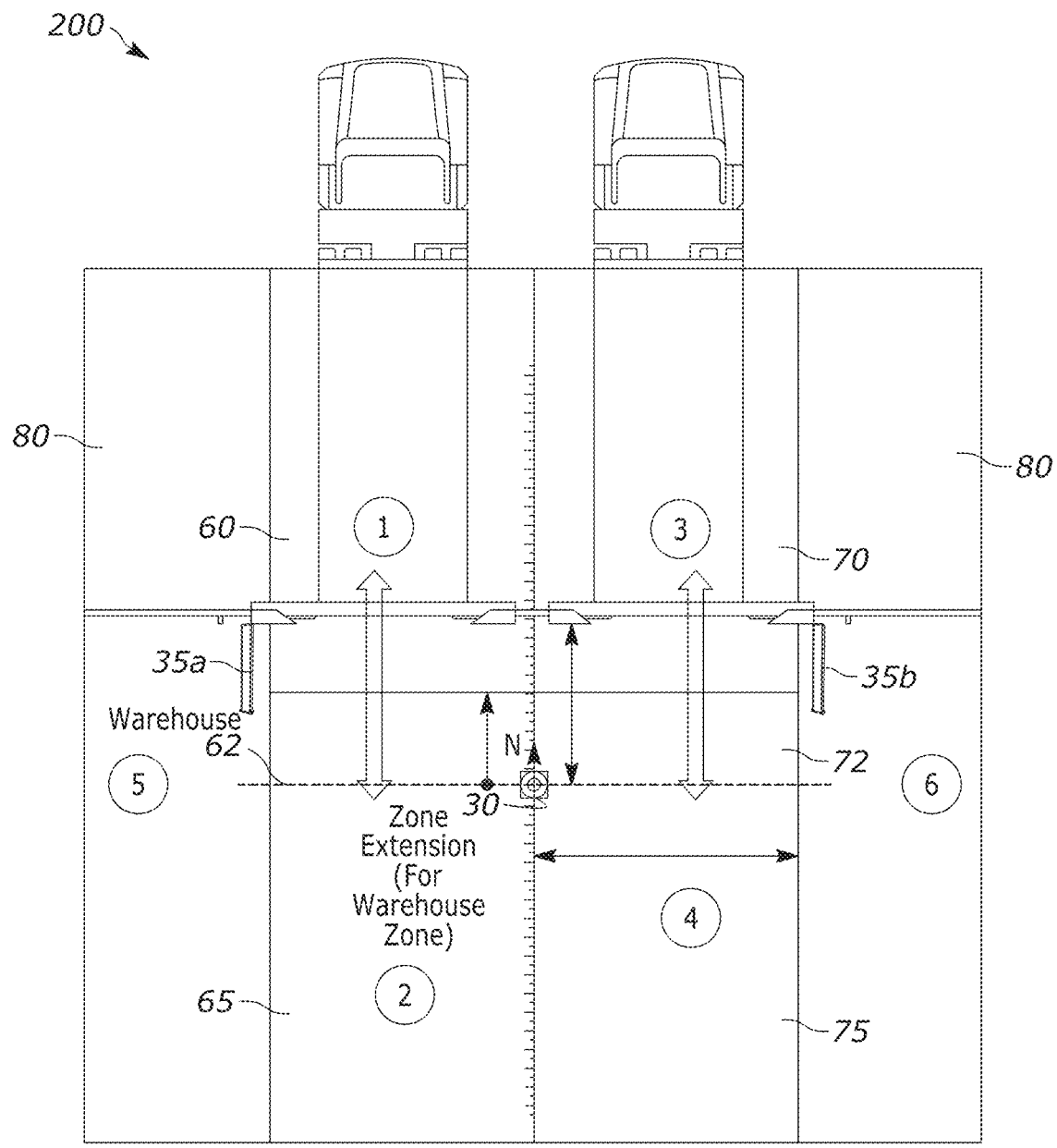
FIG. 2 illustrates a top view of an example RFID tracking system for tracking multiple lanes.

While FIG. 1 illustrates the example environment where there is a 1:1 correspondence between overhead detector station 30 and lanes, in some embodiments, the overhead detector station 30 may be configured to monitor two or more lanes of the venue 100. FIG. 2 illustrates a top view of an example venue 200 where the overhead detector station 30 is configured to monitor a first lane (the areas 60, 65) associated with the portal detector station 35a and a second lane (the areas 70, 75) associated with the portal detector station 35b. Accordingly, in the example venue 200, the central controller 16 may associate the geographic regions of the first lane (areas 60, 65) with the detector stations 30, 35a and the geographic regions of the second lane (areas 70, 75) with the detector stations 30, 35b.

In this scenario, to determine the set of unique RFID tag identifiers included in a pallet carried through the first lane, the central controller 16 may obtain the set of unique RFID tag identifiers based upon read events detected by the portal detector station 35a. The central controller 16 may then identify whether the overhead detector station 30 has generated position data for RFID tag identifiers included in the set of unique RFID tag identifiers. If so, the central controller 16 may compare that position data to the geographic regions that bound the first lane (the areas 60,65) to determine whether or not the RFID tags are positioned within the first lane or in another region (the areas 70, 75, 80). The central controller 16 may perform a similar analysis to determine whether the position data for RFID tags included in a set of unique RFID tag identifiers generated based upon read events detected at the portal detector station 35*b* are within the geographic regions that bound the second lane (the areas 70,75) or in another region of the venue 200 (the areas 60, 65, 80).

Figure 3:
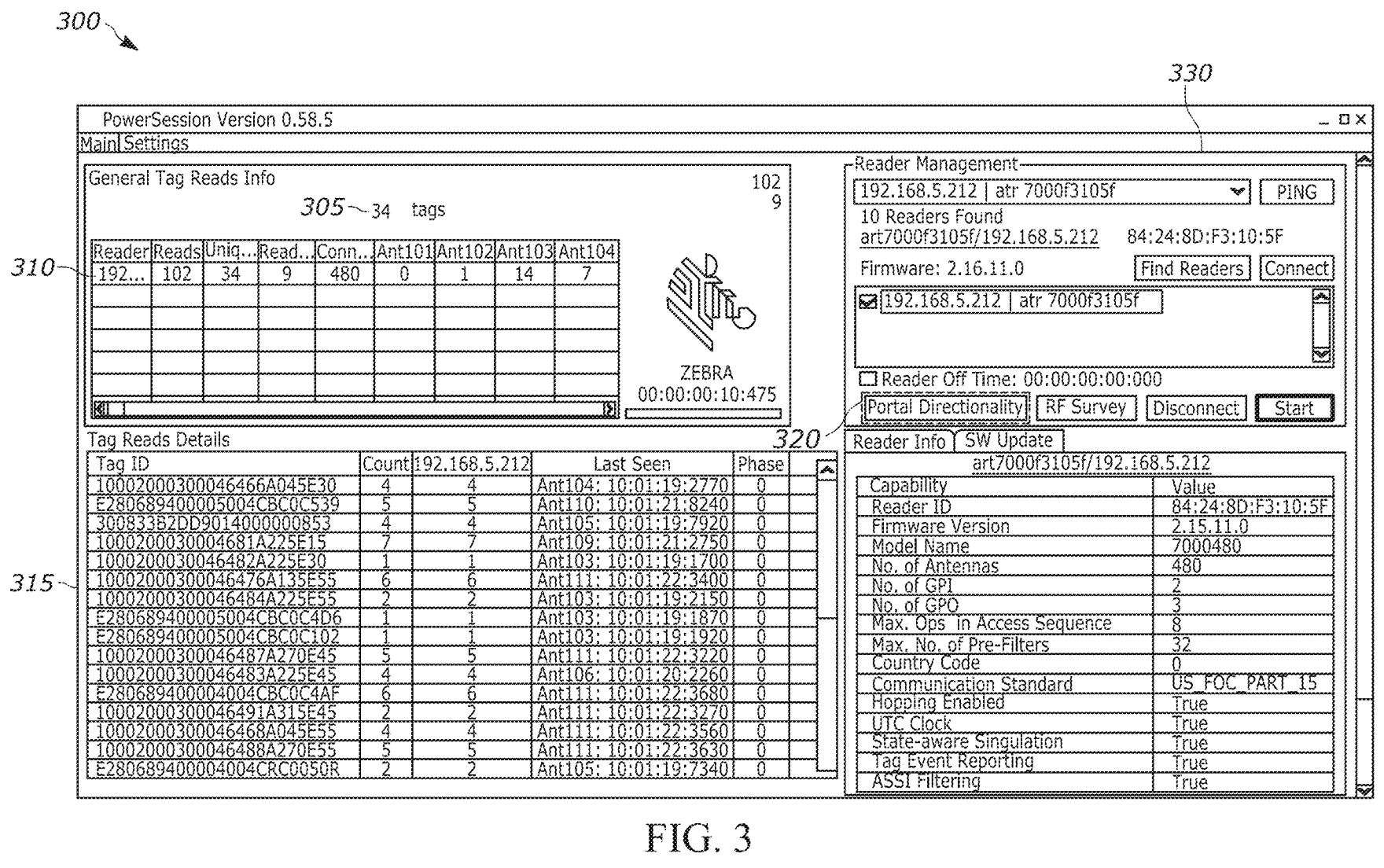

FIG. 3 illustrates an example user interface 300 for tracking RFID tags at a venue, such as the venues 100, 200. The user interface 300 may be presented via by an application executing via user equipment. To populate the data included in the user interface 300, the user equipment interfaces with the central controller 16.

The example user interface 300 includes a user interface element 330 that enables the user to select a particular detector station at the venue. For the example user interface 300, the selected detector station is an overhead detector station, such as the overhead detector station 30. It should be appreciated that the user interface 300 may also enable the selection of portal detector stations, such as the portal detector station 35. As illustrated, each detector station may correspond to a unique identifier and/or a unique network address (e.g., IP address) to facilitate the selection of a desired detector station. In response to selecting the detector station via the interface element 330, the user interface 300 presents additional information regarding the selected detector station.

In a first example, the example user interface 300 includes an indication 305 of the number of unique RFID tags tracked by the selected detector station. As a second example, the example user interface 300 includes a summary interface 310 indicating a summary of read events processed via the selected detector station (e.g., number of reads, number of unique RFID tag identifiers read, number of read cycles, etc.). As a third example, the example user interface includes a tag summary interface 315 that indicates details regarding each unique RFID tag identifier read by the selected detector station (e.g., the unique tag identifier, the number of times the tag was read, a time at which the latest read event occurred, etc.).

The example user interface 300 also includes an interface element 320 that enables the user to view the directionality of the RFID tags with respect to an associated portal detector station. Accordingly, the selection of the interface element 320 enables the user to view the direction of travel for the set of RFID tag identifiers included in the RFID tag summary interface 315 and/or the set of RFID tag identifiers detected by the associated portal detector station(s).

It should be appreciated that the example user interface 300 is one example user interface for viewing information related to the RFID tags read by the RFID tracking system. Other user interfaces may include additional, fewer, or alternative user interface elements.

Figure 4:
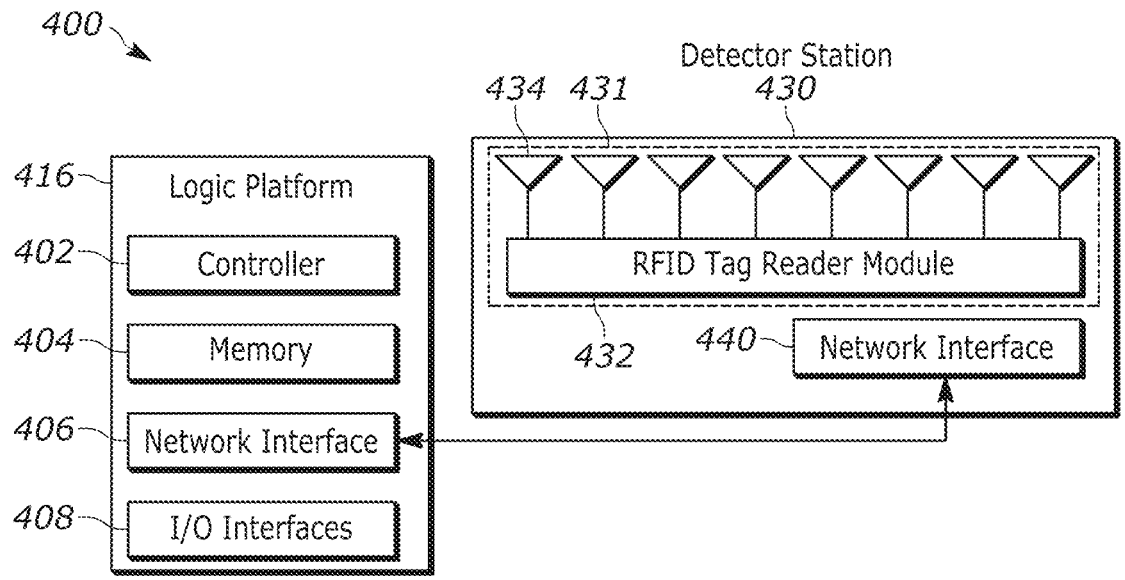
FIG. 4 is a block diagram representative of an RFID tracking system and the various components thereof.

FIG. 4 is a block diagram representative of an RFID tracking system 400 and the various components thereof capable of implementing the techniques described herein. The RFID tracking system 400 may be implemented at the venues 100, 200. The RFID tracking system 400 includes a logic platform 416 (such as the central controller 16) that functions as a processing platform capable of executing instructions to, for example, implement operations of the example methods described herein (including those described with respect to the central controller 16), as may be represented by the flowcharts of the drawings that accompany this description. Example processing platforms include, for example, implementing operations of the example methods described herein via field programmable gate arrays (FPGAs) and application specific integrated circuits (ASICs).

The logic platform 416 includes a controller 402 that includes a processor such as, for example, one or more microprocessors, controllers, and/or any suitable type of processor. The logic platform 416 includes memory (e.g., volatile memory, non-volatile memory) 404 accessible by the processor 402 (e.g., via a memory controller). The example controller 402 interacts with the memory 404 to obtain, for example, machine-readable instructions stored in the memory 404 corresponding to, for example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to the logic platform 416 to provide access to the machine-readable instructions stored thereon. The example memory 404 includes a portion thereof dedicated to storing configuration for the RFID tracking system 400, such as the geographic positions of the detector station, geographic regions that define one or more lanes of the venue, an association of the lanes and detector station(s), and so on. Additionally, the example memory 404 includes a portion thereof dedicated to storing information regarding RFID tags detected at the venue, such as the RFID tag identifier, a position of the RFID tag, which detector station detected the RFID tag, a time at which the detector station detected the RFID tag, and so on.

The logic platform 416 also includes a network interface 406 to enable communication with other machines (e.g., the detector stations 430) via, for example, one or more networks. The example network interface 406 includes any suitable type of communication interface(s) (e.g., wired and/or wireless interfaces) configured to operate in accordance with any suitable protocol(s).

The logic platform 416 also includes I/O interfaces 408 to enable receipt of user input and communication of output data to the user.

The RFID tracking system 400 also includes one or more detector stations 430 that include an RFID reader 431 operative for reading the RFID tags affixed to objects. More particularly, as shown in FIG. 4, each RFID reader 431 includes an RFID tag reader module 432 that has a controller, a memory, and an RF transceiver, which are operatively connected to a plurality of RFID antenna elements 434, which are energized by the RFID module 432 to radiate RF energy. In various embodiments, a detector 430 may include eight RFID antenna elements 434, each maintained in a fixed position. The RF reader 431 is operated, under the control of the tag reader module 432, to transmit RF beam or wave energy to the RFID tags, and to receive RF response signals from the RFID tags, thereby interrogating and processing the payloads of the RFID tags that are in a signal range of the RF transceiver. If the detector station 430 is a portal detector station, such as the portal detector station 35, the signal range is a region extending outwards from an end of the detector station 435 over a first portion of a lane.

On the other hand, if the detector station 430 is an overhead detector station, such as the overhead detector station 30, the detector station 430 may be configured to focus the radiated RF energy into a beam. As those of skill will recognize, an antenna and its beam pattern can be characterized by the antenna's beam width (i.e., the antenna's half power beam width). For an overhead detector station, the RFID signal range may be a 360° zone defined by the RFID antenna elements 434 and their collective beam patterns. That is, to form a beam in a particular direction, the RFID tag reader module 432 may configure each RFID antenna elements 434 to have a beam pattern extending in a different direction such that the collection of beams emitted from each RFID antenna element constructively interfere to produce a beam in the desired beam pattern. During operation, the RF transceivers 434 may capture RFID tag information included in an interrogation response that identifies RFID tags affixed to objects, such as objects included in a pallet. The logic platform 416 may be configured to control the RFID readers 431 in the plurality of detector stations 430 to read RFID tags within their respective signal ranges.

In overhead detector stations 430, the RFID transceivers 434 determine a signal strength for the interrogation responses received from the RFID tags. The comparative signal strengths at the each RFID antenna element 434 of a particular detector 430 are used in combination with the fixed position of the antenna elements 434 to determine the angle or arrival for the interrogation responses received from the RFID tags. The RFID tag reader module 432 and/or the logic platform 416 may utilize the angle of arrival, as well as predetermined configuration information for the detector station 430 (e.g., position and height) to determine a position for the RFID tag. The logic platform 416 may store the determined positions of the RFID tags in the memory 404.

Any of the detector stations 430 may transmit electronic information, including any RFID tag data, or other information, to the logic platform 416 for processing. For example, the logic platform 416 includes the network interface 406 communicatively coupled to network communication interfaces 440 of the detector stations 430 to receive sensed detector data, such as RFID tag data, directions of travel, and/or the inclusion in a set of RFID tags. The detector stations 430 may also receive information, commands, or execution instructions, including requests to provide additional sensory or detection information from the logic platform 416 in order to perform the features and functionally as described herein.

Figure 5:
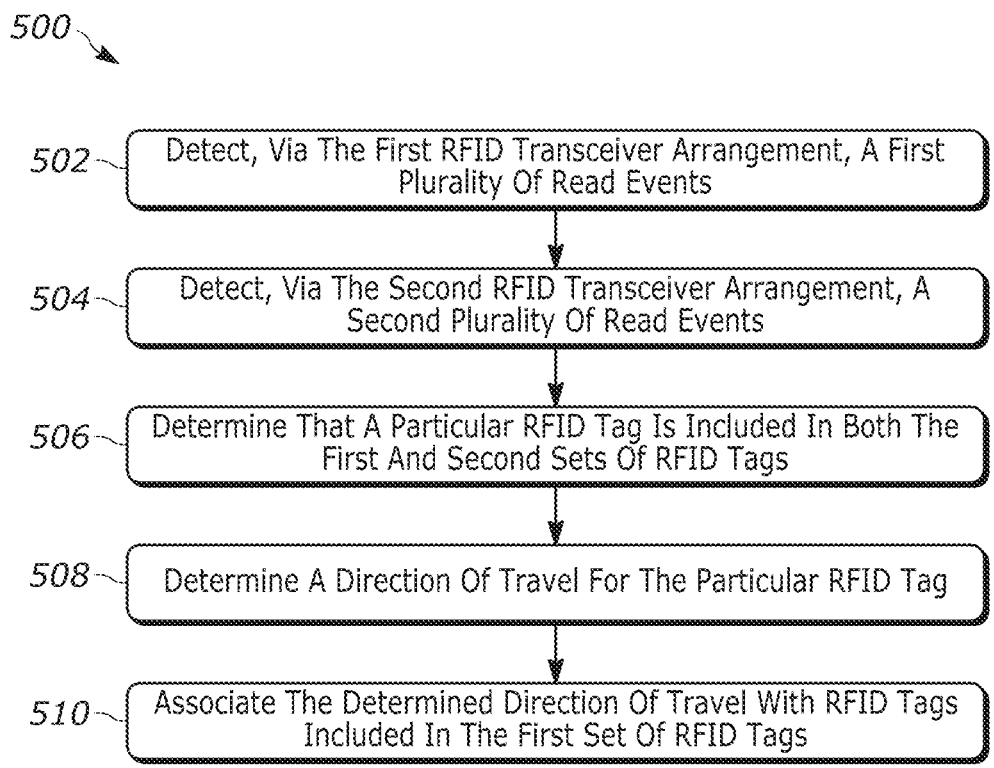
FIG. 5 illustrates a flow diagram of an example method for determining directionality of a radio frequency identification (RFID) tag in accordance with techniques described herein.

FIG. 5 illustrates an example flow diagram of an example method 500 that implements the enhanced directionality techniques described herein. In an embodiment, the method 500 is implemented by the RFID tracking system 400 of FIG. 4. As described above, in an embodiment, the RFID tracking system includes a first RFID transceiver arrangement (such as the portal detector station 35 or 430) configured to interrogate RFID tags disposed within a lane of a venue. The first RFID transceiver arrangement is also configured to have a signal range that extends over at least a first portion of the lane (such as the portion dividing the areas 60, 65). The RFID tracking system also includes a second RFID transceiver arrangement (such as the overhead detector station 30, 430) configured to interrogate RFID tags disposed within the venue. The second RFID transceiver arrangement is configured to generate a beam in a plurality of directions relative to the second RFID transceiver arrangement, wherein at least one of the directions extends over at least a second portion of the lane (such as the area 62). In some embodiments, the second portion of the lane is proximate to the first portion of the lane. As it is used herein, proximate may include being adjacent, partially-overlapping (e.g., up 5%, up to 10%, up to 25%, etc.), or in close proximity (separated by a foot, five feet, ten feet, etc.).

The RFID tracking system also include a controller, such as the central controller 16 of FIGS. 1 and 2 and the logic platform 416 of FIG. 4, operatively connected to the first RFID transceiver arrangement and the second RFID transceiver arrangement. In some embodiments, the controller is configured to perform the method actions associated with the method 500.

The method 500 begins at block 502 when the controller detects, via the first RFID transceiver arrangement, a first plurality of read events respectively corresponding to a first set of RFID tags. In some embodiments, the first plurality of read events occurred within a read window. In some further embodiments, the controller is configured to determine a set of unique RFID tag identifiers corresponding to the read events that occurred within the read window. To determine the set of unique RFID tag identifiers, the controller may either analyze the indications of the read events to derive the set of unique RFID tag identifiers or receive a report from the first transceiver arrangement indicating the unique set of RFID tag identifiers.

At block 504, the controller detects, via the second RFID transceiver arrangement, a second plurality of read events respectively corresponding to a second set of RFID tag, wherein the second plurality of read events occurred within a threshold time from the first plurality of read events. In some embodiments, the second plurality of read events occurred within the threshold time before the read window or within the threshold time after the read window. The threshold amount of time may be 2 seconds, 5, seconds, 15 seconds, and so on.

At block 506, the controller determines that a particular RFID tag is included in both the first set of RFID tags and the second set of RFID tags. That is, the controller determines that a read event indicating the unique RFID tag identifier corresponding to the particular RFID tag was detected via both the first transceiver arrangement and the second transceiver arrangement within the threshold amount of time from one another.

At block 508, the controller determines a direction of travel for the particular RFID tag based upon the read events for the particular RFID tag detected via the second RFID transceiver arrangement. As described herein, the controller may generally be configured to determine and/or track the position of RFID tags associated with read events detected via the second RFID transceiver arrangement. For example, the controller may be configured to determine a first position of the particular RFID tag based upon an angle of arrival of a first response received from the particular RFID tag at the second RFID transceiver arrangement and determine a second position of the particular RFID tag based upon an angle of arrival of a second response received from the particular RFID tag at the second RFID transceiver arrangement. To determine the position, the controller may be configured to receive an indication from the second transceiver arrangement indicating the unique RFID tag identifier, the angle of arrival, and/or a determined position. In embodiments, where the indication does not include a determined position, the controller may derive the position based upon the received indication of the angle of arrival. Regardless, in these embodiments, the controller may then compare the first position to the second position to determine the direction of travel. In some embodiments, the comparison includes determining a shift in position along an axis defined by the lane of the venue. The controller may analyze this shift in position to determine, for example, whether the RFID tag is moving along the lane in an ingress or an egress direction.

At block 510, the controller associates the determined direction of travel with RFID tags included in the first set of RFID tags. As described above, because the set of RFID tags included in the first set of RFID tags are assumed to be carried together as part of a pallet, when the controller determines the direction of travel for one RFID tag included in the first set of RFID tags, it can be assumed that the remaining RFID tags in the first set of RFID tags are moving in the same direction.

Additionally, the controller may be configured to analyze the determined position of RFID tags to detect stray read events that results in RFID tags being erroneously included in the first set of RFID tags. Accordingly, the controller may be configured to determine that a third RFID tag is not located in the second portion of the lane based upon the second plurality of read events and delete the third RFID tag from the first set of RFID tags. The controller may also perform additional actions to detect the erroneous inclusion as described below with respect to the method 600.

In some embodiments, the second transceiver arrangement may be additionally configured to detect read events for RFID tags positioned in a second lane. In these embodiments, the RFID tracking system also includes a third RFID transceiver arrangement configured to interrogate RFID tags disposed within a second lane of the venue, wherein the third RFID transceiver arrangement is configured to have a signal range that extends over at least a first portion of the second lane. Accordingly, the second transceiver arrangement may be further configured such that at least one of the directions for the beams generated by the second transceiver arrangement extends over at least a second portion of the second lane, wherein the second portion of the second lane being proximate to the first portion of the second lane.

In these embodiments, the controller may be configured to perform similar techniques to those described above with respect to blocks 502-510 with respect to read events detected via the third transceiver arrangement. That is, the controller may be configured to (1) detect, via the third RFID transceiver arrangement, a third plurality of read events respectively corresponding to a third set of RFID tags in a similar manner to that described with respect to block 502; (2) detect, via the second RFID transceiver arrangement, a fourth plurality of read events respectively corresponding to a fourth set of RFID tags in a similar manner to that described with respect to block 504; (3) determine that a second RFID tag is included in both the third set of RFID tags and the fourth set of RFID tags, wherein the fourth plurality of read events occurred within a threshold time from the third plurality of read events in a similar manner to that described with respect to block 506; (4) based upon the read events for the second RFID tag detected via the second RFID transceiver arrangement, determine a direction of travel for the second RFID tag in a similar manner to that described with respect to block 508; and (5) associate the determined direction of travel with RFID tags included in the third set of RFID tags in a similar manner to that described with respect to block 510. It should be appreciated that, in some scenarios where a pallet is moving through both of the first lane and the second lane close enough in time to one another, the second set of read events detected via the second transceiver arrangement and the fourth set of read events detected via the second transceiver arrangement may overlap with one another.

In some embodiments, the controller may be further configured to perform an inventory management task based upon the determined direction of travel for RFID tags included in the first (or third) set of RFID tags. For example, the controller may update an inventory record for an object to indicate a location of the object within a supply chain that includes a venue equipped with the RFID tracking system.

Figure 6:
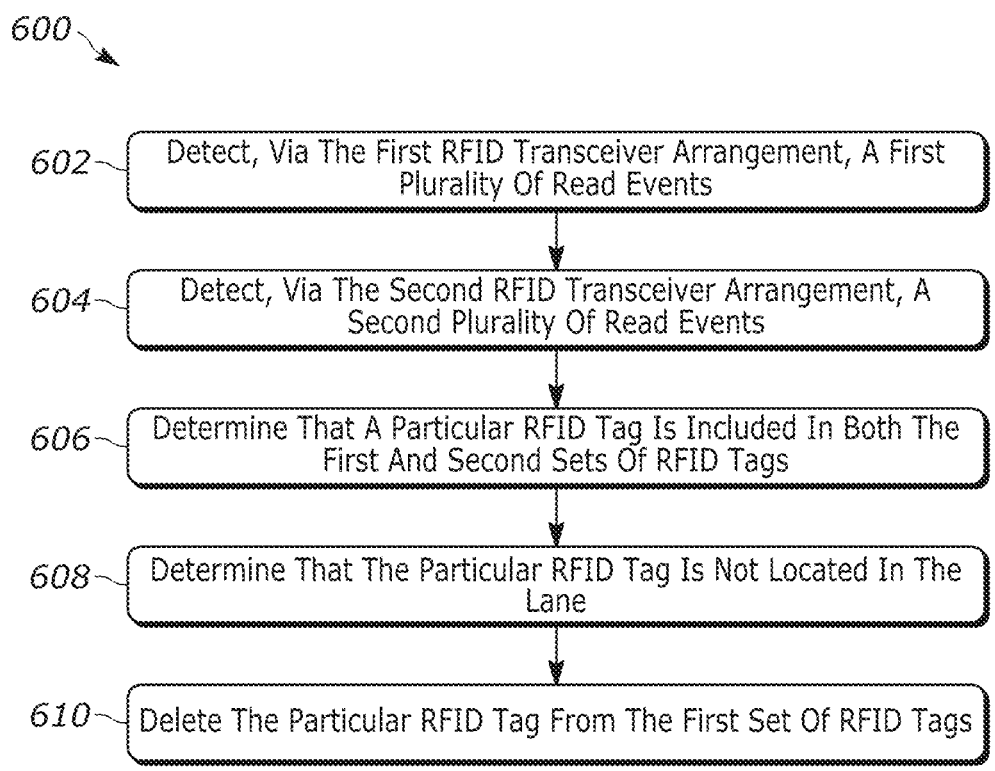
FIG. 6 illustrates a flow diagram of an example method for detecting stray radio frequency identification (RFID) tag read events in accordance with techniques described herein.

FIG. 6 illustrates an example flow diagram of an example method 600 that implements the stray RFID tag read event detection techniques described herein. In an embodiment, the flow diagram 600 is implemented by the RFID tracking system 400 of FIG. 4. As described above, in an embodiment, the RFID tracking system includes a first RFID transceiver arrangement (such as the portal detector station 35 or 430) configured to interrogate RFID tags disposed within a lane of a venue. The first RFID transceiver arrangement is also configured to have a signal range that extends over at least a first portion of the lane (such as the portion corresponding to the area 62 that divides the areas 60, 65). The RFID tracking system also includes a second RFID transceiver arrangement (such as the overhead detector station 30, 430) configured to interrogate RFID tags disposed within the venue. The second RFID transceiver arrangement is configured to generate a beam in a plurality of directions relative to the second RFID transceiver arrangement, wherein at least one of the directions extends over at least a second portion of the lane (such as the areas 60, 65). In some embodiments, the second portion of the lane is proximate to the first portion of the lane. As it is used herein, proximate may include being adjacent, partially-overlapping (e.g., up 5%, up to 10%, up to 25%, etc.), or in close proximity (separated by a foot, five feet, ten feet, etc.).

The RFID tracking system also include a controller, such as the central controller 16 of FIGS. 1 and 2 and the logic platform 416 of FIG. 4, operatively connected to the first RFID transceiver arrangement and the second RFID transceiver arrangement. In some embodiments, the controller is configured to perform the method actions associated with the method 600.

The method 600 begins at block 602 when the controller detects, via the first RFID transceiver arrangement, a first plurality of read events respectively corresponding to a first set of RFID tags. In some embodiments, the first plurality of read events occurred within a read window. In some further embodiments, the controller is configured to determine a set of unique RFID tag identifiers corresponding to the read events that occurred within the read window. To determine the set of unique RFID tag identifiers, the controller may either analyze the indications of the read events to derive the set of unique RFID tag identifiers or receive a report from the first transceiver arrangement indicating the unique set of RFID tag identifiers.

At block 604, the controller detects, via the second RFID transceiver arrangement, a second plurality of read events respectively corresponding to a second set of RFID tag, wherein the second plurality of read events occurred within a threshold time from the first plurality of read events. In some embodiments, the second plurality of read events occurred within the threshold time before the read window or within the threshold time after the read window. The threshold amount of time may be 2 seconds, 5, seconds, 15 seconds, and so on.

At block 606, the controller determines that a particular RFID tag is included in both the first set of RFID tags and the second set of RFID tags. That is, the controller determines that a read event indicating the unique RFID tag identifier corresponding to the particular RFID tag was detected via both the first transceiver arrangement and the second transceiver arrangement within the threshold amount of time from one another.

At block 608, the controller determine that the particular RFID tag is not located in the lane based upon the read events for the particular RFID tag detected via the second RFID transceiver arrangement. As described herein, the controller may generally be configured to determine and/or track the position of RFID tags associated with read events detected via the second RFID transceiver arrangement. For example, the controller may be configured to determine a position of the particular RFID tag based upon an angle of arrival of a response received from the particular RFID tag at the second RFID transceiver arrangement. To determine the position, the controller may be configured to receive an indication from the second transceiver arrangement indicating the unique RFID tag identifier, the angle of arrival, and/or a determined position. In embodiments, where the indication does not include a determined position, the controller may derive the position based upon the received indication of the angle of arrival. Regardless, in these embodiments, the controller may then compare the determined position to a geographic region corresponding to the lane. In some embodiments, the geographic region is the second portion of the lane. If the determined position is within the geographic region, then the controller determines that the particular RFID tag is within the lane. On the other hand, if the determined position is not within the geographic region, the controller determines that the RFID tag is not located within the lane.

At block 610, the controller deletes the particular RFID tag from the first set of RFID tags. As described above, because the set of RFID tags included in the first set of RFID tags are assumed to be carried together as part of a pallet, deleting the particular RFID tag from the first set of RFID tags ensures that the first set of RFID tags only includes the RFID tags affixed to an object included in the pallet.

Additionally, the controller may be configured to determine a direction of travel for RFID tags included in the first set of RFID tags. Accordingly, the controller may be configured to determine that a third RFID tag is included in both the first set of RFID tags and the second set of RFID tags. Based upon the read events for the third RFID tag detected via the second RFID transceiver arrangement, the controller determines a direction of travel for the third RFID tag and associates the determined direction of travel with RFID tags included in the first set of RFID tags. The controller may also perform additional actions to determine the direction of travel as described above with respect to the method 500.

In some embodiments, the second transceiver arrangement may be additionally configured to detect read events for RFID tags positioned in a second lane. In these embodiments, the RFID tracking system also includes a third RFID transceiver arrangement configured to interrogate RFID tags disposed within a second lane of the venue, wherein the third RFID transceiver arrangement is configured to have a signal range that extends over at least a first portion of the second lane. Accordingly, the second transceiver arrangement may be further configured such that at least one of the directions for the beams generated by the second transceiver arrangement extends over at least a second portion of the second lane, wherein the second portion of the second lane being proximate to the first portion of the second lane.

In these embodiments, the controller may be configured to perform similar techniques to those described above with respect to blocks 602-610 with respect to read events detected via the third transceiver arrangement. That is, the controller may be configured to (1) detect, via the third RFID transceiver arrangement, a third plurality of read events respectively corresponding to a third set of RFID tags in a similar manner to that described with respect to block 602; (2) detect, via the second RFID transceiver arrangement, a fourth plurality of read events respectively corresponding to a fourth set of RFID tags in a similar manner to that described with respect to block 604; (3) determine that a second RFID tag is included in both the third set of RFID tags and the fourth set of RFID tags, wherein the fourth plurality of read events occurred within a threshold time from the third plurality of read events in a similar to that described with respect to block 606; (4) based upon the read events for the second RFID tag detected via the second RFID transceiver arrangement, determine that the particular RFID tag is not located in the second lane in a similar manner to that described with respect to block 608; and (5) delete the second RFID tag from the third set of RFID tags in a similar manner to that described with respect to block 610. It should be appreciated that, in some scenarios where a pallet is moving through both of the first lane and the second lane close enough in time to one another, the second set of read events detected via the second transceiver arrangement and the fourth set of read events detected via the second transceiver arrangement may overlap with one another.

In some embodiments, the controller may be further configured to perform an inventory management task based upon the inclusion of an RFID tag in the first set of RFID tags. For example, the controller may update an inventory record for an object to indicate a location of the object within a supply chain that includes a venue equipped with the RFID tracking system.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations.

Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed:

1. A system for determining directionality of a radio frequency identification (RFID) tag within a venue, the system comprising:
    a first RFID transceiver arrangement configured to interrogate RFID tags disposed within a lane of a venue, wherein the first RFID transceiver arrangement is configured to have a signal range that extends over at least a first portion of the lane;
    a second RFID transceiver arrangement configured to interrogate RFID tags disposed within the venue, wherein the second RFID transceiver arrangement is configured to generate a beam in a plurality of directions relative to the second RFID transceiver arrangement, wherein at least one of the directions extends over at least a second portion of the lane, the second portion of the lane being proximate to the first portion of the lane;
    a third RFID transceiver arrangement configured to interrogate RFID tags disposed within a second lane of the venue, wherein the third RFID transceiver arrangement is configured to have a signal range that extends over at least a first portion of the second lane, wherein at least one of the directions for the beams generated by the second transceiver arrangement extends over at least a second portion of the second lane, the second portion of the second lane being proximate to the first portion of the second lane; and a controller operatively connected to the first RFID transceiver arrangement the second RFID transceiver arrangement, and the third RFID transceiver arrangement, wherein the controller is configured to:

detect, via the first RFID transceiver arrangement, a first plurality of read events respectively corresponding to a first set of RFID tags;

detect, via the second RFID transceiver arrangement, a second plurality of read events respectively corresponding to a second set of RFID tags, wherein the second plurality of read events occurred within a threshold time from the first plurality of read events;

determine that a particular RFID tag is included in both the first set of RFID tags and the second set of RFID tags;

based upon the read events for the particular RFID tag detected via the second RFID transceiver arrangement, determine a direction of travel for the particular RFID tag; and associate the determined direction of travel with RFID tags included in the first set of RFID tags.

2. The system of claim 1, wherein:
the first plurality of read events occurred within a read window; and
the second plurality of read events occurred within the threshold time before the read window or within the threshold time after the read window.

3. The system of claim 2, wherein to detect the first plurality of read events, the controller is configured to:
determine a set of unique RFID tag identifiers corresponding to the read events that occurred within the read window.

4. The system of claim 1, wherein to determine the direction of travel for the particular RFID tag, the controller is configured to:
determine a first position of the particular RFID tag based upon an angle of arrival of a first response received from the particular RFID tag at the second RFID transceiver arrangement;
determine a second position of the particular RFID tag based upon an angle of arrival of a second response received from the particular RFID tag at the second RFID transceiver arrangement; and
compare the first position to the second position to determine the direction of travel.

5. The system of claim 4, wherein to compare the first position to the second position, the controller is configured to:
determine a shift in position along an axis defined by the lane of the venue.

6. The system of claim 1, wherein the controller is configured to:
detect, via the third RFID transceiver arrangement, a third plurality of read events respectively corresponding to a third set of RFID tags;
detect, via the second RFID transceiver arrangement, a fourth plurality of read events respectively corresponding to a fourth set of RFID tags;
determine that a second RFID tag is included in both the third set of RFID tags and the fourth set of RFID tags, wherein the fourth plurality of read events occurred within a threshold time from the third plurality of read events;
based upon the read events for the second RFID tag detected via the second RFID transceiver arrangement, determine a direction of travel for the second RFID tag; and
associate the determined direction of travel with RFID tags included in the third set of RFID tags.

7. The system of claim 6, wherein the second set of read events overlaps the fourth set of read events.

8. The system of claim 1, wherein the controller is configured to:
based upon the second plurality of read events, determine that a third RFID tag is not located in the second portion of the lane; and
delete the third RFID tag from the first set of RFID tags.

9. A system for detecting stray radio frequency identification (RFID) tag read events at a venue, the system comprising:
a first RFID transceiver arrangement configured to interrogate RFID tags disposed within a lane of a venue, wherein the first RFID transceiver arrangement is configured to have a signal range that extends over at least a first portion of the lane;
a second RFID transceiver arrangement configured to interrogate RFID tags disposed within the venue, wherein the second RFID transceiver arrangement is configured to generate a beam in a plurality of directions relative to the second RFID transceiver arrangement, wherein at least one of the directions extends over at least a second portion of the lane, the second portion of the lane being proximate to the first portion of the lane;
a third RFID transceiver arrangement configured to interrogate RFID tags disposed within a second lane of the venue, wherein the third RFID transceiver arrangement is configured to have a signal range that extends over at least a first portion of the second lane, wherein at least one of the directions for the beams generated by the second transceiver arrangement extends over at least a second portion of the second lane, the second portion of the second lane being proximate to the first portion of the second lane; and
a controller operatively connected to the first RFID transceiver arrangement the second RFID transceiver arrangement, and the third RFID transceiver arrangement, wherein the controller is configured to:
detect, via the first RFID transceiver arrangement, a first plurality of read events respectively corresponding to a first set of RFID tags;
detect, via the second RFID transceiver arrangement, a second plurality of read events respectively corresponding to a second set of RFID tags, wherein the second plurality of read events occurred within a threshold time from the first plurality of read events;
determine that a particular RFID tag is included in both the first set of RFID tags and the second set of RFID tags;
based upon the read events for the particular RFID tag detected via the second RFID transceiver arrangement, determine that the particular RFID tag is not located in the lane; and
delete the particular RFID tag from the first set of RFID tags.

10. The system of claim 9, wherein:
the first plurality of read events occurred within a read window; and
the second plurality of read events occurred within the threshold time before the read window or within the threshold time after the read window.

11. The system of claim 10, wherein to detect the first plurality of read events, the controller is configured to: detect a plurality of read events that indicate a unique RFID tag identifier within the read window.

12. The system of claim 9, wherein to determine that the particular RFID tag is not located in the lane, the controller is configured to:
determine a position of the particular RFID based upon an angle of arrival of a response received from the particular RFID tag at the second RFID transceiver arrangement; and compare the determined position to a geographic region corresponding to the lane.

13. The system of claim 9, wherein to determine that the particular RFID tag is not located in the second lane, the controller is configured to:
determine that the particular RFID tag is not located in the second portion of the lane.

14. The system of claim 9, wherein the controller is configured to:
detect, via the third RFID transceiver arrangement, a third plurality of read events respectively corresponding to a third set of RFID tags;
detect, via the second RFID transceiver arrangement, a fourth plurality of read events respectively corresponding to a fourth set of RFID tags;
determine that a second RFID tag is included in both the third set of RFID tags and the fourth set of RFID tags, wherein the fourth plurality of read events occurred within a threshold time from the third plurality of read events;
based upon the read events for the second RFID tag detected via the second RFID transceiver arrangement, determine that the particular RFID tag is not located in the second lane; and
delete the second RFID tag from the third set of RFID tags.

15. The system of claim 14, wherein the second set of read events overlaps the fourth set of read events.

16. The system of claim 9, wherein the controller is configured to:
determine that a third RFID tag is included in both the first set of RFID tags and the second set of RFID tags;
based upon the read events for the third RFID tag detected via the second RFID transceiver arrangement, determine a direction of travel for the third RFID tag; and
associate the determined direction of travel with RFID tags included in the first set of RFID tags.

17. A method for determining directionality of a radio frequency identification (RFID) tag within a venue using an RFID tag tracking system, the RFID tag tracking system comprising (i) a first RFID transceiver arrangement configured to interrogate RFID tags disposed within a lane of a venue, wherein the first RFID transceiver arrangement is configured to have a signal range that extends over at least a first portion of the lane; (ii) a second RFID transceiver arrangement configured to interrogate RFID tags disposed within the venue, wherein the second RFID transceiver arrangement is configured to generate a beam in a plurality of directions relative to the second RFID transceiver arrangement, wherein at least one of the directions extends over at least a second portion of the lane, the second portion of the lane being proximate to the first portion of the lane; (iii) a third RFID transceiver arrangement configured to interrogate RFID tags disposed within a second lane of the venue, wherein the third RFID transceiver arrangement is configured to have a signal range that extends over at least a first portion of the second lane, wherein at least one of the directions for the beams generated by the second transceiver arrangement extends over at least a second portion of the second lane, the second portion of the second lane being proximate to the first portion of the second lane; and (iv) a controller operatively connected to the first RFID transceiver arrangement, the second RFID transceiver arrangement; and the third RFID transceiver arrangement, the method comprising:
detecting, via the first RFID transceiver arrangement, a first plurality of read events respectively corresponding to a first set of RFID tags;
detecting, via the second RFID transceiver arrangement, a second plurality of read events respectively corresponding to a second set of RFID tags, wherein the second plurality of read events occurred within a threshold time from the first plurality of read events;
determining, by the controller, that a particular RFID tag is included in both the first set of RFID tags and the second set of RFID tags;
based upon the read events for the particular RFID tag detected via the second RFID transceiver arrangement, determining, by the controller, a direction of travel for the particular RFID tag; and
associating, by the controller, the determined direction of travel with RFID tags included in the first set of RFID tags.

18. A method for detecting stray radio frequency identification (RFID) tag read events at a venue using an RFID tag tracking system, the RFID tag tracking system comprising (i) a first RFID transceiver arrangement configured to interrogate RFID tags disposed within a lane of a venue, wherein the first RFID transceiver arrangement is configured to have a signal range that extends over at least a first portion of the lane; (ii) a second RFID transceiver arrangement configured to interrogate RFID tags disposed within the venue, wherein the second RFID transceiver arrangement is configured to generate a beam in a plurality of directions relative to the second RFID transceiver arrangement, wherein at least one of the directions extends over at least a second portion of the lane, the second portion of the lane being proximate to the first portion of the lane; and (iii) a controller operatively connected to the first RFID transceiver arrangement, the second RFID transceiver arrangement, the method comprising:
detecting, via the first RFID transceiver arrangement, a first plurality of read events respectively corresponding to a first set of RFID tags;
detecting, via the second RFID transceiver arrangement, a second plurality of read events respectively corresponding to a second set of RFID tags, wherein the second plurality of read events occurred within a threshold time from the first plurality of read events;
determining, by the controller, that a particular RFID tag is included in both the first set of RFID tags and the second set of RFID tags;
based upon the read events for the particular RFID tag detected via the second RFID transceiver arrangement, determining, by the controller, that the particular RFID tag is not located in the second portion of the lane; and deleting, by the controller, the particular RFID tag from the first set of RFID tags.

\* \* \* \* \*